United States Patent
Yamazaki

[11] Patent Number: 5,933,279
[45] Date of Patent: Aug. 3, 1999

[54] OPTICAL APPARATUS

[75] Inventor: Shoichi Yamazaki, Yokohama, Japan

[73] Assignee: Canon Kabushiki Kaisha, Tokyo, Japan

[21] Appl. No.: 09/028,884

[22] Filed: Feb. 24, 1998

[30] Foreign Application Priority Data

Feb. 28, 1997 [JP] Japan ................................. 9-061982

[51] Int. Cl.⁶ .................................................. G02B 6/28
[52] U.S. Cl. ........................... 359/630; 359/631; 359/633; 359/635; 345/7; 345/8; 348/115
[58] Field of Search .................... 359/630, 631, 359/633, 635, 638, 639, 640, 835; 345/7, 8; 348/115

[56] References Cited

U.S. PATENT DOCUMENTS 5,079,416 1/1992 Filipovich ........................ 250/213 VT
5,689,736 11/1997 Okuyama et al. ..................... 396/51

FOREIGN PATENT DOCUMENTS

4-22358 1/1992 Japan .
5-303053 11/1993 Japan .

Primary Examiner—Georgia Epps
Assistant Examiner—David N. Spector
Attorney, Agent, or Firm—Fitzpatrick, Cella, Harper & Scinto

[57] ABSTRACT

An optical apparatus includes a display for displaying image information, a display optical system having a plurality of reflection surfaces for guiding a light beam from the display to an eyeball of an observer, an image sensor, an image pickup optical system having a plurality of reflection surfaces for focusing a light beam from an external field to form an image on the image sensor, and an optical path separating surface for separating an optical path in the display optical system and an optical path in the image pickup optical system from each other in opposite directions. Thus, image information provided on the display can be viewed by the observer, and a scene in the external field can be taken in the image sensor.

17 Claims, 6 Drawing Sheets

OPTICAL APPARATUS

BACKGROUND OF THE INVENTION

1. Field of the Invention

The present invention relates to an optical apparatus having the combination of an image pickup optical system receptive of a light beam from an external field for forming an image on an image pickup element to produce image information and a display optical system for guiding a light beam representative of image information displayed on display means such as a liquid crystal display device to the eyeball of an observer, and more particularly to an optical apparatus suited to be used in instruments called the head-mounted display or glasses-type display.

2. Description of Related Art

It has been known to provide an instrument in which a small-sized CCD camera is added on the head-mounted display (HMD) and the image information obtained from the small-sized CCD camera is displayed in the HMD as it is, or an instrument in which the image information obtained from the small-sized CCD camera is converted by a processor into something of image information and this image information is displayed in the HMD. In the art of HMDs too, there have been many previous proposals for the see-through type of HMD (capable of directly observing light from the external field at unit angular magnification.)

Such a form of HMD has parallax produced when the line of sight or the optical axis of the display optical system for observing the image information on the display means of the HMD comes out of coincidence with the optical axis of the CCD camera for focusing light from the external field to form an image on the surface of the CCD and obtaining image information. Apparatus free from the parallax and having the combination of an image pickup optical system and a display optical system have been proposed in Japanese Laid-Open Patent Applications No. Hei 4-22358 and No. Hei 5-303053.

In the apparatus proposed in Japanese Laid-Open Patent Application No. Hei 4-22358, the display optical system is arranged such that a light beam emitted from a small-sized liquid crystal display panel is reflected by a mirror surface on one side of a plane mirror and, then, is guided to the eyeball of an observer through an eyepiece. Meanwhile, the image pickup optical system is arranged such that a light beam from the external field is reflected by a mirror surface on another side of the plane mirror and, then, is guided to a small-sized CCD camera to form an image thereon. However, since the flat mirror is disposed aslant at 45 degrees in the apparatus, the apparatus has a tendency to become large in size. In addition, since the eyepiece is disposed before the eyeball, a see-through optical system cannot be constituted.

In Japanese Laid-Open Patent Application No. Hei 5-303053, the construction having a see-through optical system is disclosed, but the structure of the construction is complicated. Therefore, the apparatus has a tendency to become very large in size.

Further, the technique related to the invention has been disclosed, for example, in U.S. Pat. No. 5,079,416, U.S. patent application Ser. No. 08/606,825, No. 08/607,125 and No. 08/606,824 each filed on Feb. 26, 1996.

In the art of HMDs or like instruments, because the observer has to bear the instrument on his or her head, the subject for reducing the size and weight of the whole instrument is of great importance. Also, there is demand for depriving the instrument of the parallax and reducing the bulk and size despite installation of the see-through optical system.

BRIEF SUMMARY OF THE INVENTION

In accordance with the invention, in order to allow the observer to observe image information displayed on display means such as a liquid crystal display, a light beam from the display means is guided to the eyeball of the observer by a display optical system including a prism body having a plurality of decentered reflection surfaces. Further, a light beam representative of image information of the external field is focused on the image pickup plane of an image sensor such as a CCD by an image pickup optical system. Therefore, the invention sets forth appropriate features to construct the display optical system and the image pickup optical system with the size of the optical apparatus as a whole being reduced in such a manner that both pieces of image information can be observed in a good state.

In accordance with one aspect of the invention, there is provided an optical apparatus which comprises display means for displaying image information, a display optical system having a plurality of reflection surfaces for guiding a light beam from the display means to an eyeball of an observer, an image sensor, an image pickup optical system having a plurality of reflection surfaces for focusing a light beam from an external field to form an image on the image sensor, and optical path separating means for separating an optical path in the display optical system and an optical path in the image pickup optical system from each other in opposite directions.

In particular, the optical apparatus has many characteristic features as follows.

An eyeball optical axis of a light beam incident on the eyeball of the observer in the display optical system, or a virtual eyeball optical axis obtained by extending the eyeball optical axis, substantially coincides with an external-field optical axis of a light beam incident from the external field on the image pickup optical system.

The optical path separating means includes a surface having a transmitting function and a reflecting function. The light beam from the external field is allowed to pass through a portion of the image pickup optical system, then pass through the optical path separating means, then pass through a portion of the display optical system and reach the eyeball of the observer. A see-through optical system for observing image information of the external field is thus constituted.

Each of the display optical system and the image pickup optical system has a plurality of reflection surfaces decentered and having curvature.

Each of the plurality of decentered reflection surfaces has refractive powers which differ with azimuth angles about a vertex thereof.

A light beam from the display means is reflected two or three times by the plurality of reflection surfaces in the display optical system and is guided to the eyeball of the observer without forming an image.

Each of the display optical system and the image pickup optical system comprises a prism body having three or more reflection surfaces including a total reflection surface which satisfies a critical angle condition.

In accordance with another aspect of the invention, there is provided an optical apparatus which comprises display means for displaying image information, a display optical system having a plurality of reflection surfaces for guiding a light beam from the display means to an eyeball of an observer, an image sensor, an image pickup optical system having a plurality of reflection surfaces for focusing a light beam from an external field to form an image on the image sensor, and optical path separating means having reflection surfaces decentered and having curvature, for separating an optical path in the display optical system and an optical path in the image pickup optical system from each other in opposite directions, wherein the display optical system contains one of the reflection surfaces of the optical path separating means and the image pickup optical system contains the other of the reflection surfaces of the optical path separating means.

In particular, the characteristic features of such an apparatus are as follows.

Each of the decentered reflection surfaces of the optical path separating means has refractive powers which differ with azimuth angles about a vertex thereof.

An eyeball optical axis of a light beam incident on the eyeball of the observer in the display optical system, or a virtual eyeball optical axis obtained by extending the eyeball optical axis, substantially coincides with an external-field optical axis of a light beam incident from the external field on the image pickup optical system.

The reflection surfaces of the optical path separating means are half-mirror surfaces. The light beam from the external field is allowed to pass through a portion of the image pickup optical system, then pass through the optical path separating means, then pass through a portion of the display optical system and reach the eyeball of the observer. A see-through optical system for observing image information of the external field is thus constituted.

Each of the display optical system and the image pickup optical system has a plurality of reflection surfaces decentered and having curvature.

Each of the plurality of decentered reflection surfaces of the display optical system and the image pickup optical system has refractive powers which differ with azimuth angles about a vertex thereof.

In accordance with a further aspect of the invention, there is provided an image pickup optical system for focusing a light beam from an external field to form an image on a surface of an image sensor, which comprises a plurality of decentered reflection surfaces having curvature, and an optical unit having a refractive element, wherein the light beam from the external field is folded by the plurality of decentered reflection surfaces alternately to a direction toward the external field and a direction opposite thereto.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
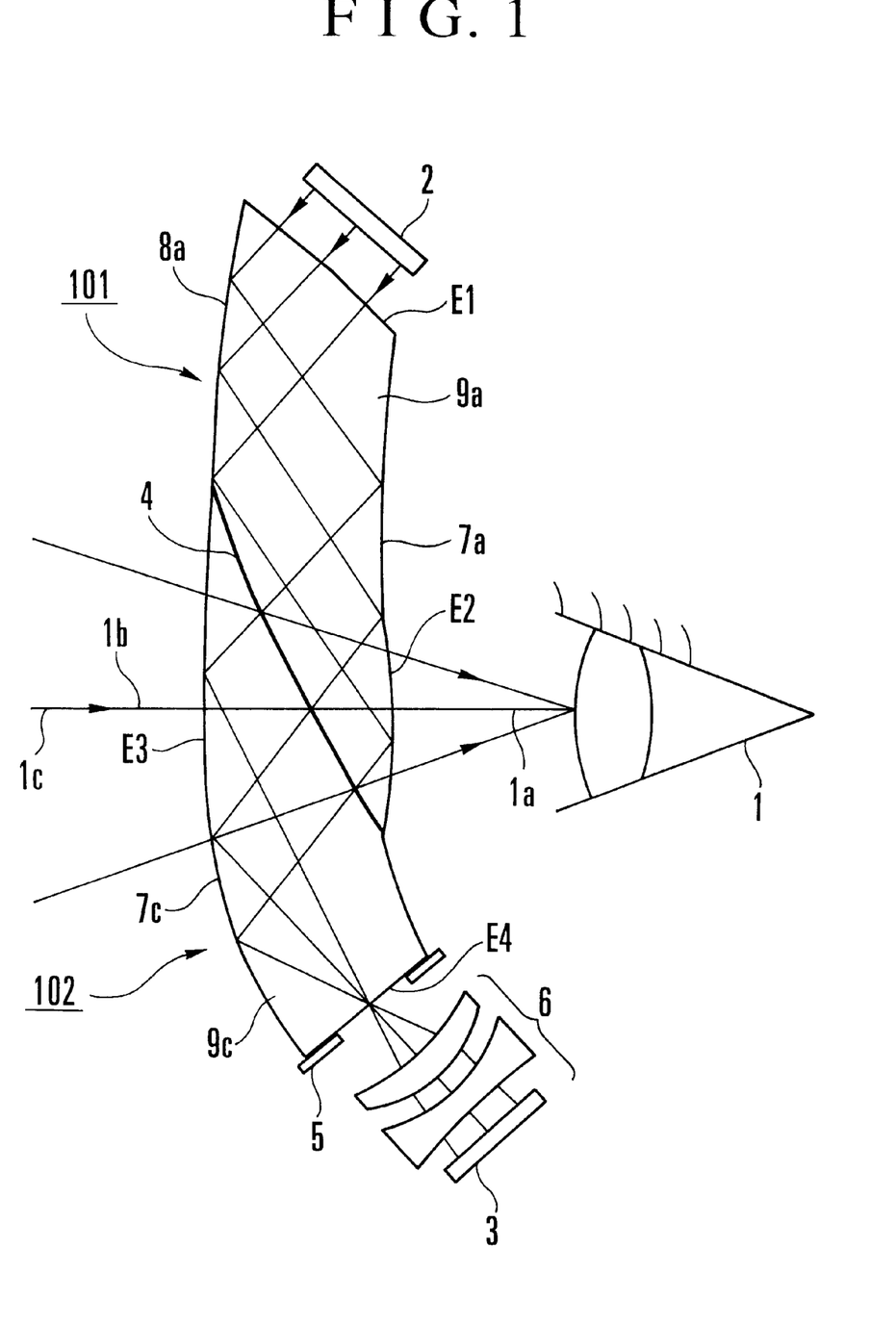
FIG. 1 is a schematic diagram of the main parts of a first embodiment of the optical apparatus according to the invention.

FIG. 1 is a schematic diagram of the main parts of a first embodiment of the optical apparatus according to the invention.

In FIG. 1, a display optical system 101 has a plurality of reflection surfaces decentered and having curvature, and is arranged to guide a light beam representative of image information displayed on a liquid crystal display (LCD) 2 to an eyeball 1 of the observer. An image pickup optical system 102 has a plurality of reflection surfaces decentered and having curvature, and is arranged to focus a light beam from the external field to form an image on an image sensor (CCD) 3.

In the first embodiment, the display optical system 101 and the image pickup optical system 102 employ prism bodies 9a and 9c, respectively, for the purpose of utilizing internal reflection a plurality of times. Optical path separating means 4 is provided for separating the optical paths of the display optical system 101 and the image pickup optical system 102 from each other. For this purpose, the optical path separating means 4 is made up from reflection surfaces decentered and having curvature at both sides. One of the reflection surfaces is used in the display optical system 101, and the other of the reflection surfaces is used in the image pickup optical system 102.

It should be noted here that the optical apparatus may be arranged such that a light beam from the external field is guided to the eyeball 1 of the observer, thus installing even a see-through optical system for observing the external field. If so, the surfaces for reflection of the optical path separating means 4 are made to be a half-mirror. (In the first embodiment, the half-mirror is not only 50% in transmittance and 50% in reflectance but can take any other values of the ratio.) For the prism bodies 9a and 9c of both the optical systems 101 and 102, their media to be used are made equal in refractive index to each other. In the first embodiment, such features are set forth to obtain the optical apparatus in a compact form.

It should be noted in the first embodiment that each of the decentered reflection surfaces has refractive powers which differ with azimuth angles about a vertex thereof, thus maintaining a good optical performance.

Incidentally, the term "decentered" reflection surface used herein refers to the lateral displacement of the center of curvature of the reflection surface from an optical axis that is taken along either the passage of a light ray from the center of the area of the image frame in the liquid crystal display (LCD) 2 to the center of the pupil in the eyeball 1 of the observer, or the passage of a light ray that comes from the external and goes to the center of area of the image frame of the image sensor (CCD) 3.

Next, explanation will be made to each of the elements of the optical apparatus shown in FIG. 1. In the display optical system 101, a light beam from the liquid crystal display (LCD) 2 enters the prism body 9a at an entrance surface E1 and is reflected by a reflection surface 8a. The light beam from the reflection surface 8a is made incident on a total reflection surface 7a at a greater angle than the critical angle and undergoes total reflection. The totally-reflected light beam is reflected by the reflection surface of the optical path separating means 4 and is then made incident on the total reflection surface 7a at a smaller angle than the critical angle. Then, the light beam passes through an exit surface E2, reaching the eyeball 1. In such a manner, the display optical system 101 guides the light beam from the liquid crystal display (LCD) 2 to the eyeball 1, as it is reflected two or three times without forming an image in the midst of the optical path. Thus, it is made possible for the observer to look at the image information presented on the liquid crystal display (LCD) 2.

As will be more fully described later, the liquid crystal display (LCD) 2 is used to present a virtual image, letting the observer see the virtual image on the real space.

In the image pickup optical system 102, a light beam from the external field enters the prism body 9c at an entrance surface E3 (a portion of the total reflection surface 7c), and is then reflected by the reflection surface of the optical path separating means 4. The light beam from the optical path separating means 4 is made incident on the total reflection surface 7 at a greater angle than the critical angle, and then undergoes total reflection, reaching an exit surface E4. Thus, in the first embodiment, the light beam from the external field is reflected to a direction toward the external field and, then, to a direction opposite thereto. After exiting the exit surface E4, the light beam passes through a diaphragm 5 and an optical unit 6 and reaches the image sensor (CCD) 3 in which an image of the external field is recorded as image information.

In the see-through optical system in the first embodiment, the light beam from the external field entering from the entrance surface E3 of the prism body 9c in the image pickup optical system 102 goes to the optical path separating means 4, where a portion of the light beam passes through the reflection surface of the optical path separating means 4 (half-mirror). This portion passes through the prism body 9a in the display optical system 101 and, as it is incident on the exit surface E2 at a smaller angle than the critical angle, emerges therefrom, thus being guided to the eyeball 1. This enables the observer to see the external field.

In the first embodiment, the surface 7a for total reflection and the surface E2 for light exit of the prism body 9a constitute the same curved surface and is used in separation depending on the condition of the incident light beam. Also, the surface E3 for light entrance and the surface 7c for total reflection of the prism body 9c constitute the same curved surface and, as in the prism body 9a, can be used in separation depending on the condition of the incident light beam. This rule applies to each of the embodiments which will be described later.

For the first embodiment, the display optical system 101 and the image pickup optical system 102 are arranged in opposed relation with the optical path separating means 4 at the boundary therebetween. The eyeball optical axis 1a of the light beam which comes from the display optical system 101 and goes to the eyeball 1, or a virtual eyeball optical axis 1b obtained by extending the eyeball optical axis 1a, is thus brought into exact or approximate coincidence with the external field optical axis 1c of the light beam which comes from the external field and is incident on the image pickup optical system 102. Accordingly, the observation of the image on the liquid crystal display (LCD) 2 (by the display optical system), the formation of the image of the external field on the image sensor (CCD) 3 (by the image pickup optical system), and the viewing of the external field (by the see-through optical system) are established simultaneously in a state free from parallax.

The features of the first embodiments which are characteristic of the invention are described below.

The display optical system 101 and the image pickup optical system 102 each have a plurality of reflection surfaces. By these reflection surfaces, the light rays from the display means and the external field are folded in the eyeball axis to the respective directions which are opposite to each other. For each ray, the forward and backward directions alternate. In such a manner, the light rays are guided to the eyeball and the image sensor, giving an advantage of reducing the thickness of the optical apparatus having a combined form of the display optical system and the image pickup optical system.

Also, in order to diminish parallax, a rule is set forth so that the external field optical axis 1c for the light beam from the external field nearly coincides with the eyeball optical axis 1a. Therefore, in a situation that the image information obtained from the image sensor (CCD) 3 is displayed on the liquid crystal display (LCD) 2, the observer looking through the display optical system 101 can view the virtual image of the external field which, as his or her head for now turns, falls in the line of sight, without parallax.

The light beam from the external field is guided through the optical path separating means 4 to the eyeball 1, permitting the observer to view the external field. At the same time, through the display optical system 101, the observer can see a display of the information that is presented in accordance with the condition of the external field as is displayed on the liquid crystal display (LCD) 2. Hence, as the image information is superimposed without parallax, the observer would see it just as what happens were in the real world. For example, in a case where the first embodiment of the invention is applied to a game machine, as a ball of the air hockey game, soccer game or the like is displayed as a computer graphics on the liquid crystal display (LCD) 2, the observer would watch the game as if the virtual image were real on the space.

Also, the plurality of reflection surfaces in each of the display optical system 101 and the image pickup optical system 102 are made to be decentered surfaces with curvature. By arranging the plurality of reflection surfaces, the optical apparatus is made thinner than was heretofore possible. In addition, the reflection surface is not a flat plane, but is provided with curvature, thereby making it possible to remove any more surfaces or any lenses which would otherwise be required.

Further, the decentered reflection surface having curvature is made to be a surface having refractive powers which differ with azimuth angles about the vertex. (This surface is hereinafter called the "free" surface, and the vertex of the surface is at a point (0,0) in the functional equation for the free surface.) A reflection surface decentered and having curvature produces decentering aberrations of revolution asymmetry, which cannot be suppressed by using a spherical or aspheric surface of revolution symmetry as usual. Since the free surface varies its refractive power due to the azimuth angle about the vertex, this principle is used in decreasing the decentering aberrations to a minimum.

In the first embodiment, the light beam from the liquid crystal display (LCD) 2, after having entered the display optical system 101, repeats reflection two or three times and then exits from the display optical system 101. Without forming any image, the light beam is guided to the eyeball 1. This assures improvements of the compact form of the display optical system 101.

Yet another feature is that the display and image pickup optical systems each employ a prism body having three or more different optical surfaces including a total reflection surface which satisfies the critical angle condition. If this total reflection surface also serves as a permeable exit surface of the prism body, the light rays can be either transmitted or reflected (totally) according to the angle of incidence on the surface. It is the common practice to use a half mirror when both functions of transmitting and reflecting are given at once. However, an inadequate light amount results. On the contrary, in the first embodiment, the surface to be used is of total reflection, so that the light loss does not occur at all. Hence, the image becomes brighter.

The optical path separating means 4 in the first embodiment is constructed from one reflecting section decentered and having curvature. So, the display optical system 101 contains one side of the reflecting section as a reflection surface, while the image pickup optical system contains the other side as a reflection surface. Since the optical path separating means 4 is decentered and formed not in the plane but to have curvature, the necessity of both optical systems for using any more reflection surfaces or adding lenses is obviated. Also, since one reflecting section suffices for separating the optical paths, the optical apparatus becomes smaller in whole.

Also, the reflection surfaces of the optical path separating means 4 are made to have refractive powers which differ with azimuth angles about the vertex, thus correcting the decentering aberrations produced from both the optical systems 101 and 102.

In the first embodiment, the image pickup optical system 102 that conducts the light from the external field to form an image on the image sensor (CCD) 3 is provided with a plurality of decentered reflection surfaces having curvature arranged such that the light rays from the external field are folded in the optical axis forward and backward alternately. After that, the light rays are allowed to pass through the diaphragm 5 and the optical unit 6, thus being guided to the image sensor (CCD) 3. The use of the plurality of decentered reflection surfaces having curvature thus leads to obviate the necessity of using any more reflection surfaces and of adding a lens or lenses and, by folding the light rays to opposite directions alternately, to reduce the thickness of the image pickup optical system 102.

The diaphragm 5 and the optical unit 6 are positioned behind the image pickup optical system 102, thereby contributing to improvements of the balance in size between the decentered reflection surfaces having curvature of the image pickup optical system 102 and the optical unit 6. Also, all of the decentered reflection surfaces having curvature of the image pickup optical system 102 are made to produce a positive refractive power as a whole, reducing the diameter of the aperture of the diaphragm 5.

Also, the prism body 9c having three or more different optical planes or surfaces including the decentered ones is in use, and the diaphragm 5 is positioned adjacent to the exit surface of the prism body 9c. As the decentered reflection surfaces having curvature are formed as the prism surfaces, all of them can be made up as a unit, which is easy to manufacture. Also, the positioning of the diaphragm 5 in the neighborhood of the exit surface of the prism body 9c ensures minimization of the prism body 9c.

The focus adjustment of the image pickup optical system 102 is carried out by using the optical unit 6 behind the diaphragm 5. This is because the optical unit 6 is small in size, as it takes its place behind the diaphragm 5. So, focusing is easy to perform.

Another feature of the invention is that the magnification of the image cast on the retina of an eyeball with the light directly coming from the external field is made nearly equal to that of the image cast on the retina of the same eyeball with the light from the LCD as an image of the external field is taken as information in the CCD. This is because the external field cannot be viewed when the see-through optical system is not in use. Even if so, it is made possible to reproduce a feeling just as one were viewing the external field. In another case where the see-through optical system is in use, as the LCD presents the display of an image of the external field at the same magnification, this image can overlap on the external field viewed through the see-through optical system. Therefore, suppose, for example, the image information to be used is obtained from the CCD by infrared rays, then the observer becomes able to view whatever cannot be perceived by means of the see-through optical system.

Next, second to tenth embodiments of the invention will be described in respect mainly to their individual different points from those of the first embodiment shown in FIG. 1.

Figure 2:
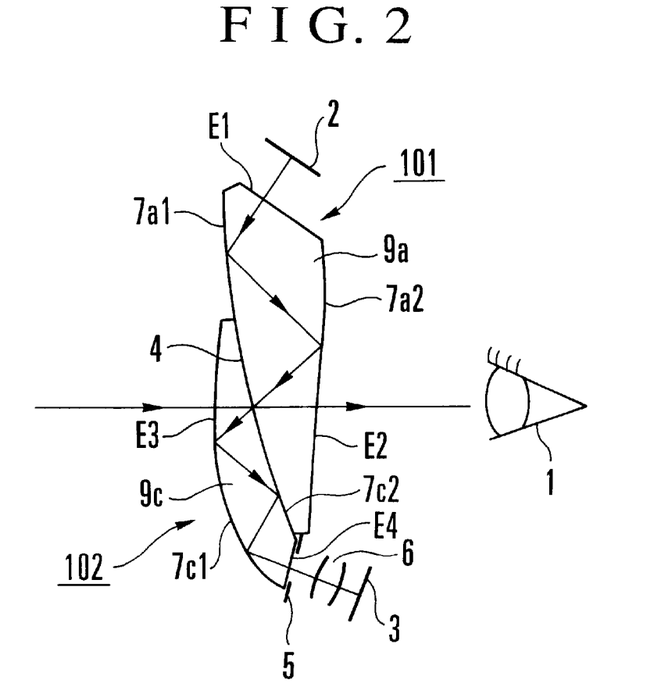
FIG. 2 is a schematic diagram of the main parts of a second embodiment of the optical apparatus according to the invention.
Figure 3:
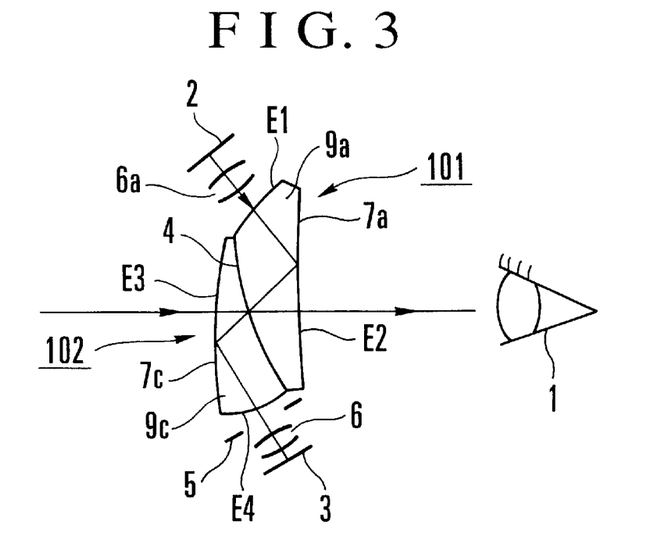
FIG. 3 is a schematic diagram of the main parts of a third embodiment of the optical apparatus according to the invention.
Figure 4:
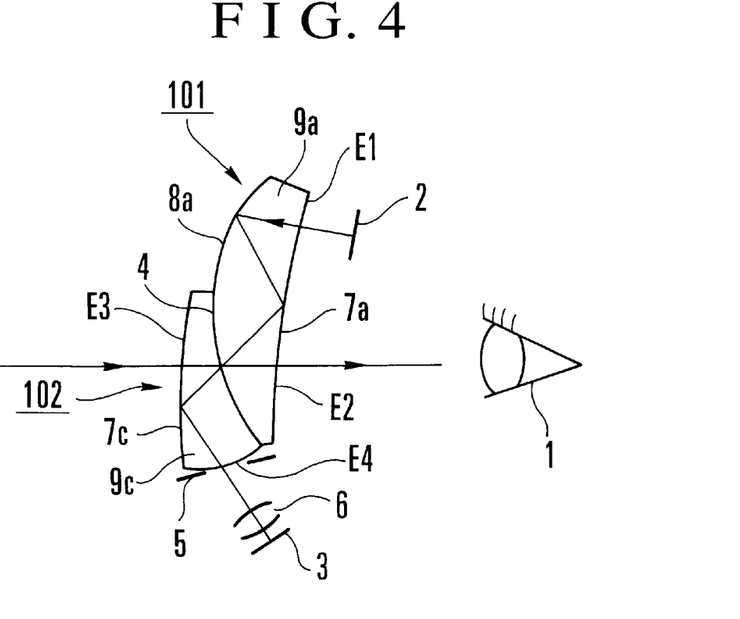
FIG. 4 is a schematic diagram of the main parts of a fourth embodiment of the optical apparatus according to the invention.

FIG. 2 to FIG. 4 are schematic diagrams of the main parts of the second to fourth embodiment of the optical apparatus according to the invention.

In the second embodiment shown in FIG. 2, for the display optical system 101, the liquid crystal display (LCD) 2 radiates light rays which, after having entered the prism body 9a at the entrance surface E1, undergo successive reflections in the following order. The light rays reflect from a total reflection surface 7a1, from a total reflection surface 7a2, and from the optical path separating means 4 to the exit surface E2 of the prism body 9a. The exiting light beam goes to the eyeball 1. In the image pickup optical system 102, a light beam from the external field enters the prism body 9c at the entrance surface E3, then reflects from the optical path separating means 4, then totally reflects from the reflection surface 7c1, then totally reflects from the reflection surface 7c2, then totally reflects again from the reflection surface 7c1, then exits from the exit surface E4 of the prism body 9c, and then passes through the diaphragm 5 to the optical unit 6, by which it is focused to form an image on the image sensor (CCD) 3. For the see-through optical system, the light beam travels in the same path as that shown in FIG. 1.

The total reflection surface 7a2 and the exit surface E2 of the prism body 9a constitute the same curved surface. Also, the entrance surface E3 and the total reflection surface 7c1 of the prism body 9c constitute the same curved surface.

In the third embodiment shown in FIG. 3, the light beam from the liquid crystal display (LCD) 2 in the display optical system 101 enters the prism body 9a at the entrance surface E1, then totally reflects from a reflection surface 7a, then reflects from the optical path separating means 4, and then exits from the exit surface E2 of the prism body 9a, reaching the eyeball 1. For the image pickup optical system 102, a light beam from the external field enters the prism body 9c at the entrance surface E3, then reflects from the optical path separating means 4, then totally reflects from the reflection surface 7c, then exits from the exit surface E4 of the prism body 9c, and then passes through the diaphragm 5 to the optical unit 6, by which it is focused to form an image on the image sensor (CCD) 3. For the see-through optical system, the path of the light beam is the same as that shown in FIG. 1.

Incidentally, in the third embodiment, the display optical system 101 may be provided with another optical unit 6a positioned between the liquid crystal display (LCD) 2 and the prism body 9a.

In the fourth embodiment shown in FIG. 4, the light beam from the liquid crystal display (LCD) 2 in the display optical system 101 enters the prism body 9a at the entrance surface E1 in the part of a total reflection surface 7a, then reflects from a reflection surface 8a, then totally reflects from the total reflection surface 7a, then reflects from the optical path separating means 4, and then exits from the exit surface E2 of the prism body 9a, reaching the eyeball 1. The path of the light beam in the image pickup optical system 102 is arranged in the same way as that of the third embodiment shown in FIG. 3. The path of the light beam in the see-through optical system is the same as that shown in FIG. 1.

The entrance surface E1, the total reflection surface 7a and the exit surface E2 of the prism body 9a constitute the same curved surface.

Figure 5:
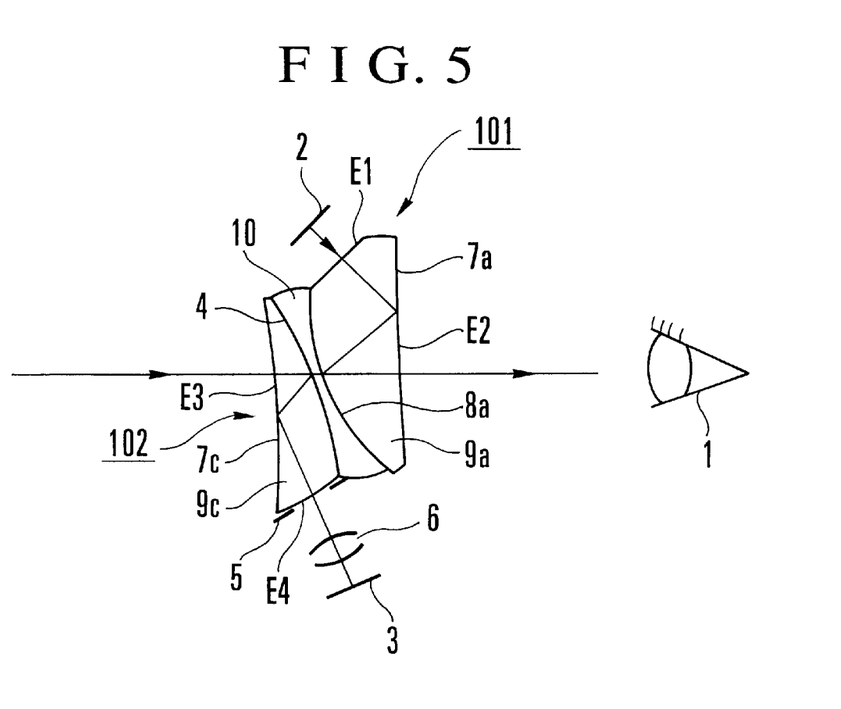
FIG. 5 is a schematic diagram of the main parts of a fifth embodiment of the optical apparatus according to the invention.
Figure 6:
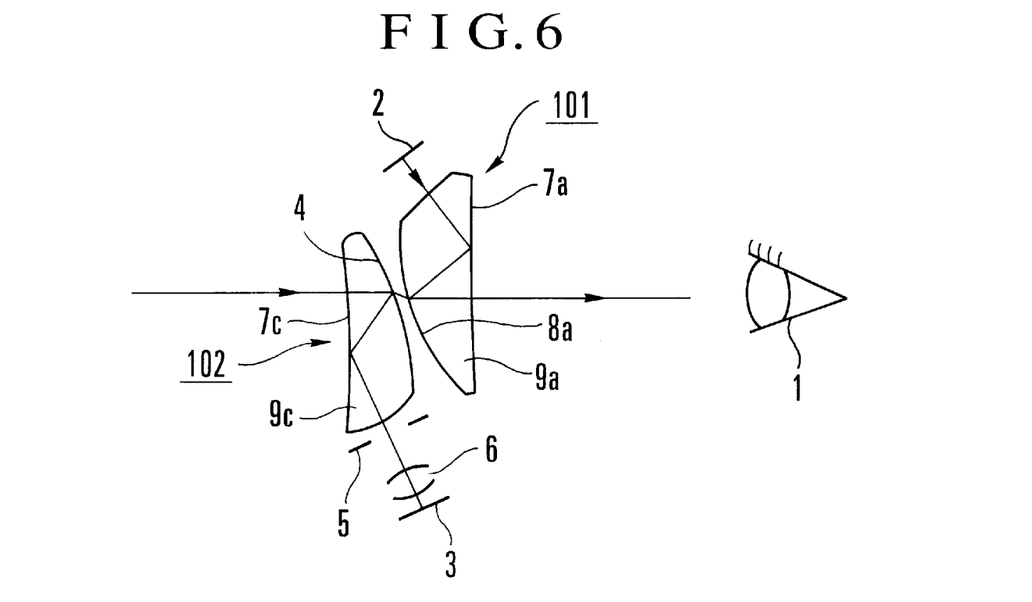
FIG. 6 is a schematic diagram of the main parts of a sixth embodiment of the optical apparatus according to the invention.

FIG. 5 and FIG. 6 are schematic diagrams of the main parts of fifth and sixth embodiments of the optical apparatus according to the invention.

The fifth and sixth embodiments are similar to the first to fourth embodiments shown in FIGS. 1 to 4 in that the display optical system 101 and the image pickup optical system 102 employ the prism bodies, but are different in a point that both the optical systems 101 and 102 are provided with respective individual optical path separating means (8a, 4). The other basic constituents remain the same. Since, in the fifth and sixth embodiments, the optical systems to be used are independent of each other, the number of optical surfaces is reduced, and a good optical performance is obtained.

The fifth embodiment shown in FIG. 5 is similar in the path of the light beam to the third embodiment shown in FIG. 3, but are different only in a point that use is made of a junction intermediary 10 between the prism bodies 9a and 9c of the two optical systems 101 and 102. The junction intermediary 10 is made up from an adhesive agent, a cemented lens or the like. So, when the refractive index of the material of the junction intermediary 10 is made the same as that of both prism bodies 9a and 9c, and when the optical path separating means 4 of the image pickup optical system 102 and the reflection surface 8a are made half-mirrored, a see-through optical system is installed. The optical path of the see-through optical system is arranged such that a light beam from the external field enters the prism body 9c of the image pickup optical system 102 at the entrance surface E3, then permeates through the optical path separating means 4 (half-mirror), then passes through the junction intermediary 10, then permeates the reflection surface 8a of the prism body 9a of the display optical system 101 and then, as it is incident on the exit surface E2 at a smaller angle than the critical angle, goes through the exit surface E2 to the eyeball 1.

In the sixth embodiment shown in FIG. 6, for the display optical system 101 and the image pickup optical system 102, the path of the light beam is the same as that of the third embodiment shown in FIG. 3. The only one different point is that the medium between the prism bodies 9a and 9c of the optical systems 101 and 102 is air. To provide the sixth embodiment with a see-through optical system, it is only necessary to make use of half-mirrors in the surface 8a of the prism body 9a and the surface 4 of the prism body 9c.

FIGS. 7 to 10 are schematic diagrams of the main parts of seventh to tenth embodiments of the optical apparatus according to the invention.

Figure 7:
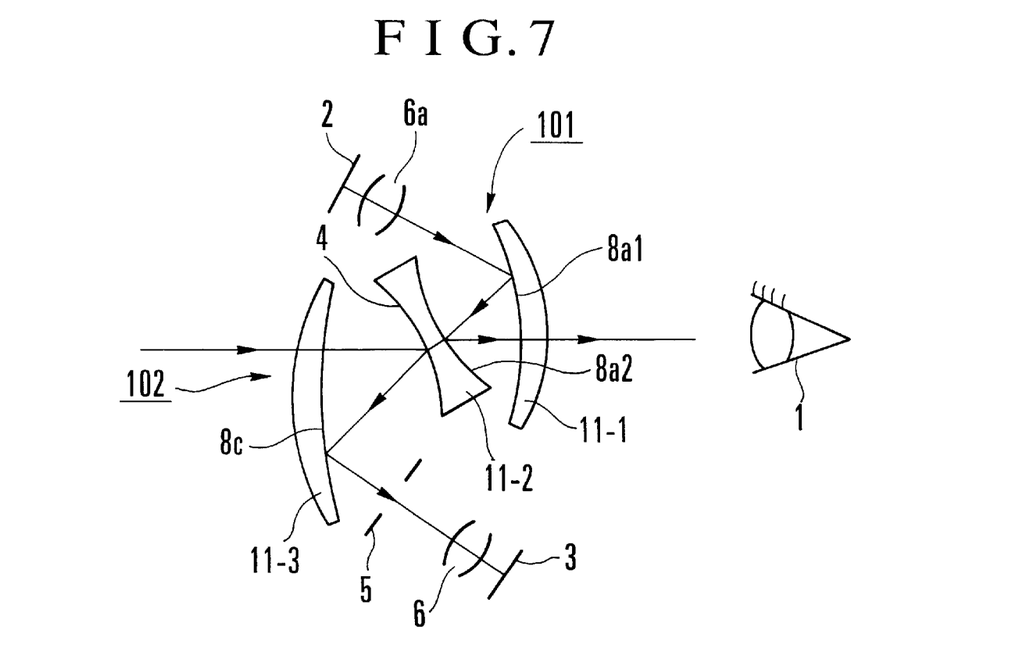
FIG. 7 is a schematic diagram of the main parts of a seventh embodiment of the optical apparatus according to the invention.

In the seventh embodiment shown in FIG. 7, the display optical system 101 and the image pickup optical system 102 each are constructed with a lens having two optical surfaces. The light beam from the liquid crystal display (LCD) 2 of the display optical system 101 passes through the lens unit 6a, then reflects from a reflection surface 8a1 of a lens 11-1, then reflects from a reflection surface 8a2 of a lens 11-2, and then passes through the lens 11-1, reaching the eyeball 1. For the image pickup optical system 102, a light beam from the external field passes through a lens 11-3, then reflects from the optical path separating means 4 of the lens 11-2, then reflects from a reflection surface 8c of the lens 11-3, and then passes through the diaphragm 5 to the optical unit 6 by which it is focused to form an image on the image sensor (CCD) 3.

Figure 8:
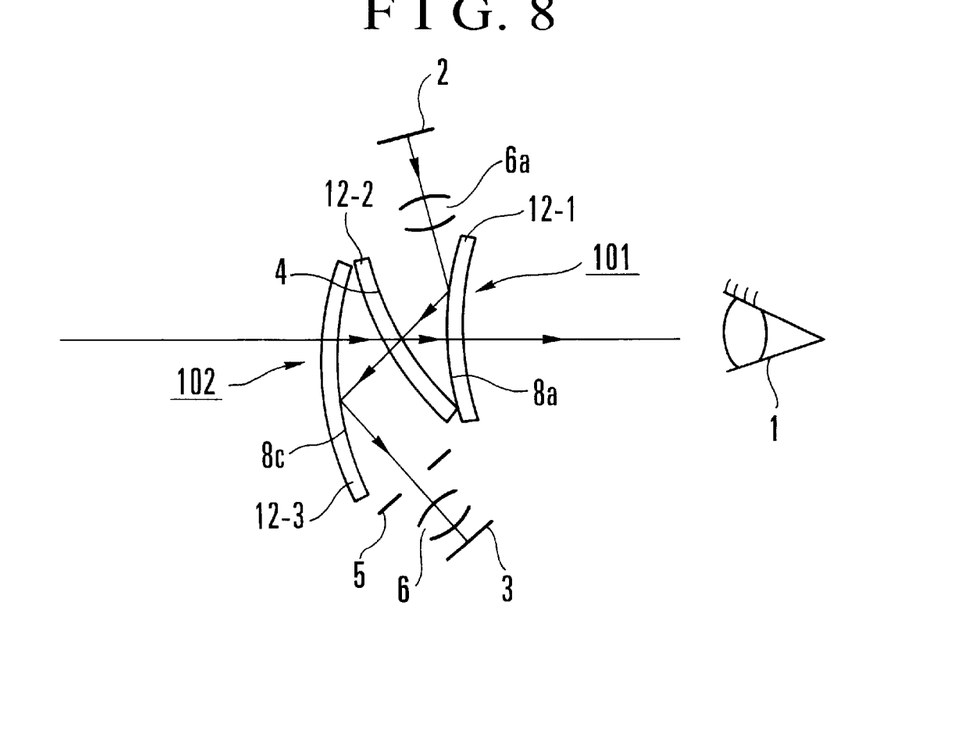
FIG. 8 is a schematic diagram of the main parts of an eighth embodiment of the optical apparatus according to the invention.
Figure 9:
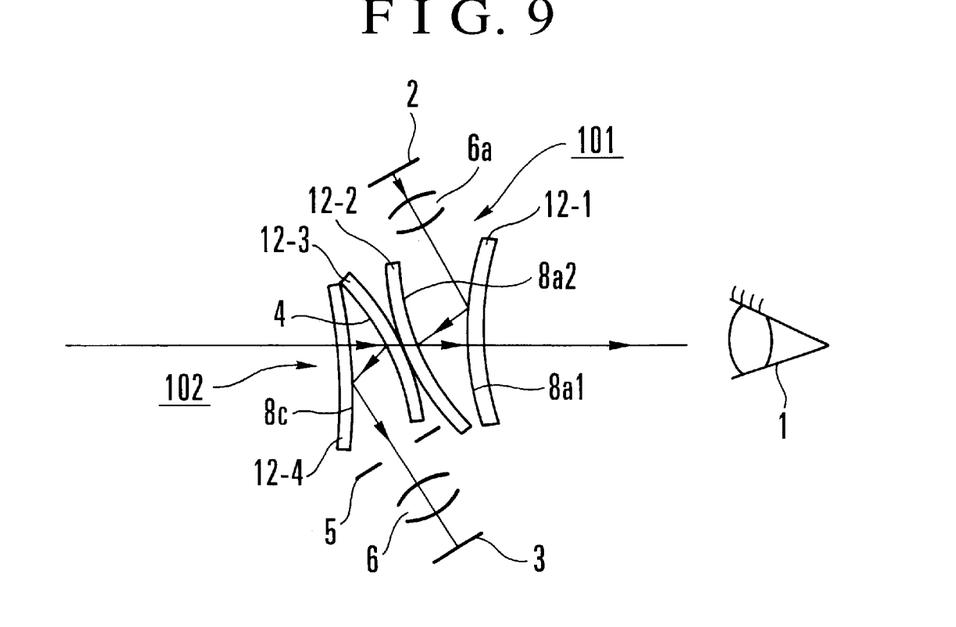
FIG. 9 is a schematic diagram of the main parts of a ninth embodiment of the optical apparatus according to the invention.
Figure 10:
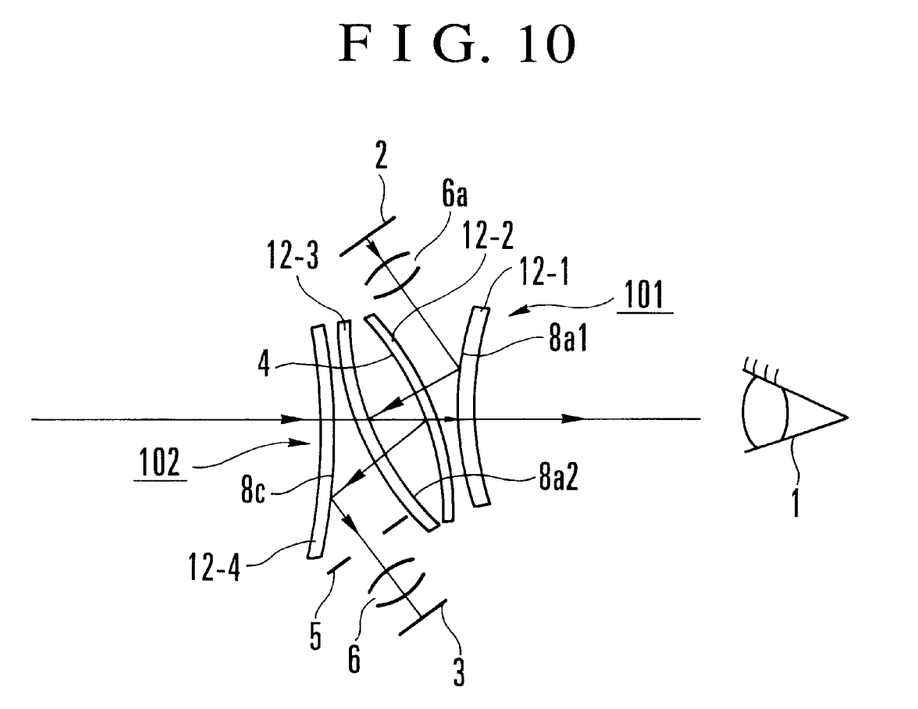
FIG. 10 is a schematic diagram of the main parts of a tenth embodiment of the optical apparatus according to the invention.

In the eighth to tenth embodiments shown in FIGS. 8 to 10, optical elements 12-1 to 12-3 each are made up from a thin reflection plate having curvature. In such a case, the see-through optical system suffers almost no deterioration of the optical performance. Therefore, the obtained images are of good quality.

In the eighth embodiment shown in FIG. 8, one surface of the optical path separating means 4 is made to be a reflection surface. The display optical system 101 uses the outer side of the reflection surface. The image pickup optical system 102 uses the inner side of the reflection surface. Incidentally, for a see-through optical system to establish, the reflection surface of the optical path separating means 4 is made to be a half-mirror.

A light beam from the liquid crystal display (LCD) 2 of the display optical system 101 passes through the lens unit 6a, then reflects from a reflection surface 8a of a reflection plate 12-1, then reflects from the optical path separating means 4 of a reflection plate 12-2, and then passes through the reflection plate 12-1, reaching the eyeball 1. For the image pickup optical system 102, a light beam from the external field permeates a reflection plate 12-3, then reflects from the optical path separating means 4 of the reflection plate 12-2, then reflects from a reflection surface 8c of the reflection plate 12-3, and then passes through the diaphragm 5 to the optical unit 6 by which it is focused to form an image on the image sensor (CCD) 3.

For the see-through optical system, a light beam from the external field permeates the reflection plate 12-3 of the image pickup optical system 102, then permeates the optical path separating means 4 (half-mirror), then permeates the reflection plate 12-1 of the display optical system 101 and then goes to the eyeball 1.

In the ninth embodiment shown in FIG. 9, the display optical system 101 and the image pickup optical system 102 have no common optical surface (common reflection surface). This makes them independent of each other. To each of them, a fewer number of optical surfaces suffice for a good optical performance.

A light beam from the liquid crystal display (LCD) 2 of the display optical system 101 passes through the lens unit 6a, then reflects from a reflection surface 8a1 of a reflection plate 12-1, then reflects from a reflection surface 8a2 of a reflection plate 12-2, and then passes through the reflection plate 12-1, reaching the eyeball 1. For the image pickup optical system 102, a light beam from the external field permeates a reflection plate 12-4, then reflects from the optical path separating means 4 of a reflection plate 12-3, then reflects from a reflection surface 8c of the reflection plate 12-4, and then passes through the diaphragm 5 to the optical unit 6 by which it is focused to form an image on the image sensor (CCD) 3.

Also, when each of the optical path separating means 4 of the image pickup optical system 102 and the reflection surface 8a2 of the display optical system 101 is made to be a half-mirror, a see-through optical system is installed.

For the see-through optical system, a light beam from the external field permeates the reflection plate 12-4 of the image pickup optical system 102, then permeates the optical path separating means 4 (half-mirror), then permeates the reflection surface 8a2 (half-mirror) of the display optical system 101, then permeates the reflection plate 12-1 and then goes to the eyeball 1.

In the tenth embodiment shown in FIG. 10, a characteristic feature thereof is that the display optical system 101 and the image pickup optical system 102 are provided with overlapping portions with each other in the optical paths thereof so that they have a common optical surface but no common reflection surface. This makes it possible that the optical apparatus as a whole becomes very thin. Also, since they have no common reflection surface, a good optical performance is obtained by a fewer number of optical surfaces.

Of four reflection plates (12-1 to 12-4), the intermediate two 12-2 and 12-3 are made half-mirrored with the former at the optical path separating means 4 and the latter at a reflection surface 8a2, thus establishing a display optical system 101, an image pickup optical system 102 and a see-through optical system.

A light beam from the liquid crystal display (LCD) 2 of the display optical system 101 passes through the lens unit 6a, then reflects from the reflection surface 8a1 of the reflection plate 12-1, then permeates the optical path separating means 4 (half-mirror) of the image pickup optical system 102, then reflects from the reflection surface 8a2 (half-mirror) of the reflection plate 12-3, then permeates the optical path separating means 4 (half-mirror) of the image pickup optical system 102, and then permeates the reflection plate 12-1, reaching the eyeball 1.

For the image pickup optical system 102, a light beam from the external field permeates the reflection plate 12-4, then permeates the reflection surface 8a2 (half-mirror) of the reflection plate 12-3 of the display optical system 101, then reflects from the optical path separating means 4 (half-mirror) of the reflection plate 12-2, then permeates the reflection surface 8a2 (half-mirror) of the reflection plate 12-3 of the display optical system 101, then reflects from the reflection surface 8c of the reflection plate 12-4, and then passes through the diaphragm 5 to the optical unit 6 by which it is focused to form an image on the image sensor (CCD) 3.

For the see-through optical system, a light beam from the external field permeates the reflection plate 12-4 of the image pickup optical system 102, then permeates the reflection surface 8a2 (half-mirror) of the reflection plate 12-3 of the display optical system 101, then permeates the optical path separating means 4 (half-mirror) of the image pickup optical system 102, then permeates the reflection plate 12-1 and then goes to the eyeball 1.

According to the invention, as described, image information provided on the display means such as a liquid crystal display is observed through a plurality of decentered reflection surfaces. The image of the external field is formed on the image sensor such as a CCD by the image pickup optical system to produce image information. By setting forth appropriate features to construct the display optical system and the image pickup optical system, it is made possible to achieve an optical apparatus whose size as a whole is minimized, while still making it possible to observe both pieces of image information in a good state.

I claim:

1. An optical apparatus comprising:
   display means for displaying image information;
   a display optical system having a plurality of reflection surfaces for guiding a light beam from said display means to an eyeball of an observer;
   an image sensor;
   an image pickup optical system having a plurality of reflection surfaces for focusing a light beam from an external field to form an image on said image sensor; and
   optical path separating means for separating an optical path in said display optical system and an optical path in said image pickup optical system from each other in opposite directions.

2. An optical apparatus according to claim 1, wherein an eyeball optical axis of a light beam incident on the eyeball of the observer in said display optical system, or a virtual eyeball optical axis obtained by extending the eyeball optical axis, substantially coincides with an external-field optical axis of a light beam incident from the external field on said image pickup optical system.

3. An optical apparatus according to claim 1, wherein said optical path separating means includes a surface having a transmitting function and a reflecting function, and the light beam from the external field is allowed to pass through a portion of said image pickup optical system, then pass through said optical path separating means, then pass through a portion of said display optical system and reach the eyeball of the observer, so that a see-through optical system for observing image information of the external field is constituted.

4. An optical apparatus according to claim 1, wherein each of said display optical system and said image pickup optical system has a plurality of reflection surfaces decentered and having curvature.

5. An optical apparatus according to claim 4, wherein each of the plurality of decentered reflection surfaces has refractive powers which differ with azimuth angles about a vertex thereof.

6. An optical apparatus according to claim 4, wherein the light beam from the display means is reflected two or three times by the plurality of reflection surfaces in said display optical system and is guided to the eyeball of the observer without forming an image.

7. An optical apparatus according to claim 4, wherein each of said display optical system and said image pickup optical system comprises a prism body having three or more reflection surfaces including a total reflection surface which satisfies a critical angle condition.

8. An optical apparatus comprising:
   display means for displaying image information;
   a display optical system having a plurality of reflection surfaces for guiding a light beam from said display means to an eyeball of an observer;

an image sensor;

an image pickup optical system having a plurality of reflection surfaces for focusing a light beam from an external field to form an image on said image sensor; and optical path separating means having reflection surfaces decentered and having curvature, for separating an optical path in said display optical system and an optical path in said image pickup optical system from each other in opposite directions, wherein said display optical system contains one of the reflection surfaces of said optical path separating means and said image pickup optical system contains the other of the reflection surfaces of said optical path separating means.

9. An optical apparatus according to claim 8, wherein each of the decentered reflection surfaces of said optical path separating means has refractive powers which differ with azimuth angles about a vertex thereof.

10. An optical apparatus according to claim 8, wherein an eyeball optical axis of a light beam incident on the eyeball of the observer in said display optical system, or a virtual eyeball optical axis obtained by extending the eyeball optical axis, substantially coincides with an external-field optical axis of a light beam incident from the external field on said image pickup optical system.

11. An optical apparatus according to claim 8, wherein each of the reflection surfaces of said optical path separating means has a transmitting function and a reflecting function, and the light beam from the external field is allowed to pass through a portion of said image pickup optical system, then pass through said optical path separating means, then pass through a portion of said display optical system and reach the eyeball of the observer, so that a see-through optical system for observing image information of the external field is constituted.

12. An optical apparatus according to claim 8, wherein each of said display optical system and said image pickup optical system has a plurality of reflection surfaces decentered and having curvature.

13. An optical apparatus according to claim 12, wherein each of the decentered reflection surfaces has refractive powers which differ with azimuth angles about a vertex thereof.

14. An image pickup optical system for focusing a light beam from an external field to form an image on a surface of an image sensor, said image pickup optical system comprising:

a plurality of decentered reflection surfaces having curvature;

a diaphragm; and an optical unit having a refractive element, wherein the light beam from the external field is folded by said plurality of decentered reflection surfaces alternately to a direction toward the external field and a direction opposite thereto, and is then guided to the image sensor through said diaphragm and said optical unit.

15. An image pickup optical system according to claim 14, wherein each of said plurality of decentered reflection surfaces has refractive powers which differ with azimuth angles about a vertex thereof.

16. An image pickup optical system according to claim 14, wherein said plurality of decentered reflection surfaces constitute a prism body having at least three optical surfaces, and said diaphragm is disposed adjacent to a light exit surface of said prism body.

17. An image pickup optical system according to claim 14, wherein said optical unit is movable in a direction of an optical axis thereof to effect focusing.

* * * * *

UNITED STATES PATENT AND TRADEMARK OFFICE
CERTIFICATE OF CORRECTION

PATENT NO. : 5,933,279

DATED : August 3, 1999

INVENTOR(S) : Shoichi YAMAZAKI

It is certified that error appears in the above-identified patent and that said Letters Patent is hereby corrected as shown below:

COLUMN 1:

Line 62, "application" should read --Applications-- and "08/607,125" should read --08/607,175--.

COLUMN 5:

Line 6, "external" should read --external field--.

COLUMN 8:

Line 37, "embodiment" should read --embodiments--.

Signed and Sealed this

Twenty-fourth Day of October, 2000

*Attest:*

Q. TODD DICKINSON

*Attesting Officer*     *Director of Patents and Trademarks*